2,901,321
Patented Aug. 25, 1959

2,901,321
TWO-STEP METHOD OF MAKING CALCIUM OXIDE FROM CALCIUM SULFATE

Knud S. Horn, Dumesnil, Argentina

No Drawing. Application June 20, 1956
Serial No. 592,478

3 Claims. (Cl. 23—186)

The present invention relates to the reduction of sulfates, and more particularly to a two-step heating process for desulfurizing calcium sulfate to produce calcium oxide substantially free of sulfur.

Sulfuric acid is one of the most important heavy chemicals in the chemical industry and at present is produced from elemental sulfur or iron sulfide. Deposits of elemental sulfur are found only in the United States and Italy, while deposits of iron sulfide are found in Germany and Russia. Accordingly, countries which do not have such deposits are at a distinct disadvantage in that they have no commercially feasible process for producing sulfuric acid unless the raw material is imported. Many countries which do not have deposits of elemental sulfur or iron sulfide do, however, have deposits of calcium sulfate in the form of gypsum which could be used for manufacturing sulfuric acid if there were a commercially feasible method of obtaining sulfur dioxide for use in the production of sulfuric acid by the reduction of gypsum.

A great amount of spent sulfuric acid is produced in the chemical industry as a waste product, the disposal of which presents certain problems. The spent sulfuric acid cannot be disposed of by allowing it to run into a river or stream or into the soil, since it would cause injury to the flora and fauna into which it came into contact. It is, therefore, a normal practice to neutralize the spent sulfuric acid, such as pickling liquor used in the iron and steel industry, with limestone and then dispose of the product. This product is gypsum mixed with iron oxide which at present has no commercial value. If the solid residue obtained from the spent pickling liquor neutralized with limestone could be decomposed into sulfur dioxide and lime, it would become an important product commercially rather than a waste product. The gypsum waste product from the aluminum industry would also become important commercially.

There are a great number of patents and scientific articles devoted to the decomposition of gypsum by heat treatment. Calcium sulfate in the form of gypsum can be decomposed by heat alone or by adding a reducing agent such as coal, sulfur, or pyrite during the heating process. In the heat decomposition of gypsum inert materials such as sand, clay, lime, or iron oxide, may also be utilized.

The heretofore known processes for decomposing gypsum suffer from the disadvantage in that they yield a small amount of sulfur dioxide and produce calcium oxide having a high sulfur content. This high sulfur content of the calcium oxide represents sulfur which has not been converted to sulfur dioxide and which accordingly is not available for use in the manufacture of sulfuric acid. In addition a high sulfur content calcium oxide is unsuitable for use in operations where calcium oxide substantially free of sulfur is required, e.g., in making pharmaceuticals. For example, gypsum can be rapidly heated to a high temperature, such as 2700° F., without any decomposition at all taking place. It is believed that when gypsum or gypsum plus a reducing agent is rapidly heated at a high temperature, a cake of cinders is formed which is coated with a fused indestructible material in the form of a very stable eutectoid which prevents further decomposition of gypsum from taking place.

It is, therefore, the object of the present invention to provide a process for desulfurizing calcium sulfate to produce calcium oxide which will be substantially free of sulfur, i.e., have a sulfur content less than about 0.1% by weight.

In accordance with the present invention it was found that calcium sulfate can be desulfurized to produce calcium oxide substantially free of sulfur by heat treatment provided the heat treatment is done by a two-step process. It was found that when calcium sulfate is heated and ground at a relatively low temperature that the sulfur content thereof could be reduced in half without incipient fusion taking place so that the ground particles of calcium sulfate are not coated with a protective eutectoid. The sulfur content of the calcium sulfate may then be reduced to an amount less than about 0.1% by heating the calcium sulfate at an elevated temperature.

The process of the present invention, therefore, comprises heating and grinding calcium sulfate at a temperature in the range from about 1000° F. to about 2000° F. and then heating the calcium sulfate at a temperature in the range from about 2100° F. to about 2700° F. The heating and grinding of the calcium sulfate at a temperature in the range from about 1000° F. to about 2000° F. may be readily accomplished by feeding the calcium sulfate at a rate of about 30 to about 40 kilograms per hour through a conventional heated rotary ball grinding mill where the sulfur content of the calcium sulfate is reduced to about 10%. The calcium sulfate may then be heated at an elevated temperature in the range from about 2100° F. to about 2700° F. at the same feed rate in a conventional combustion chamber where the sulfur content is reduced to an amount less than about 0.1% and calcium oxide is collected.

The above feed rate is merely illustrative of the pilot plant operations of the examples below and was used in a rotary ball grinding mill having a diameter of one foot eight inches, a length of three feet, a rotation of twenty-five revolutions per minute and a twenty kilogram charge of one inch grinding bodies. The mill was connected to a combustion chamber four feet high and three feet by three feet square wherein the same feed rate is utilized. The feed rate in the rotary ball grinding mill and in the combustion chamber will, of course, be dependent upon the size thereof and is not a critical condition in the process of the invention.

It will be appreciated that the process of the invention is applicable to calcium sulfate in the form of gypsum, anhydrite, in the form of the solid residue obtained from spent pickling liquor neutralized with limestone, or other forms of calcium sulfate. The sulfur dioxide drawn off during the heating of the calcium sulfate may be fed to a sulfuric acid plant for conversion to sulfuric acid or may be compressed to a liquid form and shipped to a sulfuric acid plant.

The processes of the invention will be described in further detail in connection with the following examples.

EXAMPLE 1

Gypsum having the following analysis was fed at a rate of 30 kilograms per hour through a heated rotary ball grinding mill where it was heated and ground at a temperature of 1310° F.

*Analysis of gypsum on a hydrated basis*

| Components: | Percent by weight |
|---|---|
| Loss on ignition | 19.5 |
| $SiO_2$ | 6.4 |
| $R_2O_3$ | 2.4 |
| CaO | 32.3 |
| MgO | 0.8 |
| $SO_3$ | 37.8 |
| Total | 99.2 |

*Analysis of gypsum on a dehydrated basis*

| Components: | Percent by weight |
|---|---|
| $SiO_2$ | 7.9 |
| $R_2O_3$ | 3.0 |
| CaO | 40.1 |
| MgO | 1.0 |
| $SO_3$ | 48.0 |
| Total | 100.0 |

In the above analysis the $R_2O_3$ is principally $Fe_2O_3$. The product passing from the heated rotary ball grinding mill having a sulfur content of 8.37% was fed at the same rate to a heated combustion chamber having a temperature of 2300° F. where calcium oxide was collected having a sulfur content of 0.12%.

EXAMPLE 2

Gypsum having the same analysis as that in Example 1 was fed at a rate of 30 kilograms per hour through a heated rotary ball grinding mill where the gypsum was heated at a temperature of 1330° F. The product leaving the mill had a sulfur content of 9.12%. The product was fed at the same rate into a heated combustion chamber having a temperature of 2270° F. where calcium oxide was collected having a sulfur content of 0.08%.

EXAMPLE 3

In the absence of the industrial solid residue obtained from spent pickling liquor neutralized with limestone a product was prepared from iron oxide in the form of rusted iron shavings mixed with gypsum having the same analysis as the industrial residue, namely as follows:

| Components: | Percent by weight |
|---|---|
| Loss on ignition | 9.6 |
| $SiO_2$ | 3.1 |
| $Al_2O_3$ | 0.9 |
| $Fe_2O_3$ | 50.7 |
| CaO | 16.3 |
| MgO | 0.4 |
| $SO_3$ | 19.1 |
| Total | 100.1 |

This material was fed through a heated rotary ball grinding mill at a rate of 40 kilograms per hour where it was heated and ground at a temperature of 1310° F. The product was fed into a combustion chamber at the same rate heated to a temperature of 2270° F. where calcium oxide was collected having a sulfur content of 0.07%.

It will be noted that Examples 1 and 2 illustrate the process of the invention as applied to the two-step heat treatment of calcium sulfate in the form of gypsum. Example 3 illustrates the process of the invention as applied to calcium sulfate in the form of the solid residue obtained from spent pickling liquor neutralized with limestone.

It will be appreciated that various modifications and changes may be made in the process of the invention without departing from the spirit thereof and accordingly the process of the invention is to be limited only within the scope of the appended claims.

I claim:

1. A two-step process of desulfurizing calcium sulfate to produce calcium oxide substantially free of sulfur comprising simultaneously heating and grinding calcium sulfate in the absence of a reducing agent therefor at a temperature in the range from about 1000° F. to about 2000° F. to reduce the sulfur content thereof approximately in half without incipient fusion taking place and to form ground particles free from a coating of protective eutectoid and then heating the resulting ground particles at a temperature in the range from about 2100° F. to about 2700° F. to form calcium oxide having a sulfur content less than about 0.1% by weight.

2. The process as set forth in claim 1 wherein the calcium sulfate is in the form of gypsum.

3. The process as set forth in claim 1 wherein the calcium sulfate is in the form of the solid residue obtained from spent pickling liquor neutralized with limestone.

References Cited in the file of this patent

UNITED STATES PATENTS

| | | |
|---|---|---|
| 1,845,744 | Fleck | Feb. 16, 1932 |
| 2,232,099 | De Jahn | Feb. 18, 1941 |
| 2,334,621 | Goodell | Nov. 16, 1943 |
| 2,426,147 | Horn | Aug. 19, 1947 |
| 2,621,118 | Cyr et al. | Dec. 9, 1952 |
| 2,650,159 | Tarr et al. | Aug. 25, 1953 |
| 2,740,691 | Burwell | Apr. 3, 1956 |

FOREIGN PATENTS

| | | |
|---|---|---|
| 694,035 | Great Britain | July 15, 1953 |